US005658649A

United States Patent [19]

Wrobleski et al.

[11] Patent Number: 5,658,649

[45] Date of Patent: Aug. 19, 1997

[54] CORROSION RESISTANT COATING

[75] Inventors: Debra A. Wrobleski; Brian C. Benicewicz, both of Los Alamos, N. Mex.; Karen G. Thompson, Orlando; Coleman J. Bryan, Merritt Island, both of Fla.

[73] Assignee: The Regents of the University of California office of Technology Transfer, Alameda, Calif.

[21] Appl. No.: 345,974

[22] Filed: Nov. 28, 1994

Related U.S. Application Data

[63] Continuation of Ser. No. 58,829, May 4, 1993, abandoned, which is a continuation of Ser. No. 850,592, Mar. 13, 1992, abandoned.

[51] Int. Cl.$^6$ .............................. B32B 7/02; B32B 15/08

[52] U.S. Cl. .......................... 428/213; 428/213; 428/332; 428/334; 428/413; 428/423.1; 428/447; 428/457; 428/500

[58] Field of Search .................................... 427/409, 410; 428/413, 423.1, 447, 500, 457, 332, 334, 213, 215

[56] References Cited

U.S. PATENT DOCUMENTS

| | | | |
|---|---|---|---|
| 3,151,050 | 9/1964 | Wilburn | 427/409 X |
| 4,316,939 | 2/1982 | Guyomard | 428/413 |
| 4,692,225 | 9/1987 | Witucki et al. | 204/59 R |

FOREIGN PATENT DOCUMENTS

| | | |
|---|---|---|
| 2000431 | 10/1989 | Canada . |

OTHER PUBLICATIONS

DeBerry, "Modification of the Electrochemical and Corrosion Behavior of Stainless Steels with an Electroactive Coating", Electrochem. Soc.:Electrochemical Science and Technology 132, pp. 1022–1026 (1985).

Jain et al., "Formation of an Active Electronic Barrier at Al/Semiconductor Interfaces: A Novel Approach in Corrosion Prevention", Corrosion, 42, pp. 700–707 Dec. 1986.

Jain et al., "Configured Semiconductor/Insulation Coatings for Corrosion Prevention", Mat. Res. Soc. Symp. Proc., 125, pp. 329–341 (1988).

Jain et al., "Corrosion Prevention in Metals Using Layered Semi–Conductor/Insulator Structures Forming an Interfacial Electronic Barrier", in *Adhesive, Sealants, and Coatings for Space and Harsh Environments,* edited by L. H. Lee, (Plenum Publishing Corp., New York, 1988), pp. 381–405.

Hettiarachchi et al., "Corrosion Inhibition of Steel By Phthalocyanine Coatings", Proc. Electrochem. Soc., 89(1), pp. 320–326 (1989).

Daily, "Results of an Experimental Cathodic Protection Installation Using Conductive Coating Systems", Corrosion/87 Symp., 1987, pp. 126–133. [Also 112: 11187a].

Lee, "Adhesives, Sealants, and Coating for Space and Harsh Environments", J. Poly, Mat. Sci. & Eng., 56, 198 (1987).

*Primary Examiner*—D. S. Nakarani
*Attorney, Agent, or Firm*—Bruce H. Cottrell

[57] ABSTRACT

A method of protecting a metal substrate from corrosion including coating a metal substrate of, e.g., steel, iron or aluminum, with a conductive polymer layer of, e.g., polyaniline, coating upon said metal substrate, and coating the conductive polymer-coated metal substrate with a layer of a topcoat upon the conductive polymer coating layer, is provided, together with the resultant coated article from said method.

9 Claims, No Drawings

CORROSION RESISTANT COATING

This application is a continuation of application Ser. No. 08/058,829, filed May 4, 1993, now abandoned, which is a continuation of application Ser. No. 07/850,592, filed Mar. 13, 1992, now abandoned.

This invention is the result of a contract with the Department of Energy (Contract No. W-7405-ENG-36).

FIELD OF THE INVENTION

The present invention relates to the field of coatings and more particularly to corrosion resistant coatings.

BACKGROUND OF THE INVENTION

Corrosion damage in industrialized countries is a major problem with the resultant costs for replacement of damaged parts, with the dangers from affected structures such as bridges, pipes, storage tanks and other large metal structures, and with the degraded appearance of, e.g., cars and buildings subjected to corrosion. Increasingly, corrosion prevention techniques have been sought to reduce the total costs of such corrosion. Painting is the most common method of preventing corrosion of mild steel which is the most widely used construction material. Various techniques have been employed in paint systems in the efforts to control corrosion. Among these are the use of anti-corrosive pigments such as zinc chromate or in many large fixed structures the use of cathodic protection such as by galvanic protection or by impressed current. Cathodic electrodeposition has been widely used for corrosion protection in, e.g., the automotive industry, but the process is not as well adapted to large fixed steel structures.

Electroactive coatings such as polyaniline coatings upon steel substrates have been described, by DeBerry in J. Electrochemical Society, Vol. 132, No. 5, pp. 1022–1026 (1985), as providing a type of anodic protection to such substrates within an acidic environment. Other types of electroactive materials such as indium-tin oxide coatings, described by Jain et al. in Corrosion-NACE, Vol. 42, No. 12, pp. 700–707 (1986), or phthalocyanine coatings described, by Hettiarachchi et al. in Proc. Electrochem. Soc., Vol. 89-1, pp. 320–325 (1989) have also been suggested as providing corrosion protection to substrates.

Accordingly, it is an object of this invention to provide a process of reducing corrosion to metallic substrates and particularly reducing corrosion to large metallic substrates such as, e.g., bridges, storage tanks, and space vehicle launch support structures.

It is a further object of this invention to provide a coating composition for reducing corrosion to metallic substrates.

It is a still further object of this invention to provide a coated article having reduced corrosion upon its metallic components.

SUMMARY OF THE INVENTION

To achieve the foregoing and other objects, and in accordance with the purposes of the present invention, as embodied and broadly described herein, the present invention provides a method of protecting a metal substrate from corrosion including coating a metal substrate subject to corrosion with a layer of a conductive polymer coating, and coating the conductive polymer-coated metal substrate with a layer of a topcoat upon the conductive polymer coating layer. Generally, the metal substrate is selected from the group consisting of alloy steel, stainless steel iron, nickel, nickel-based alloys or aluminum. One especially suitable conductive polymer is polyaniline. Further, the present invention provides a coated article having improved corrosion resistance, the article including a metal substrate selected from the group consisting of alloy steel, stainless steel iron, nickel, nickel-based alloys or aluminum, a layer of a conductive polymer coating upon said metal substrate, and a topcoat layer upon the conductive polymer coating layer, said topcoat layer adapted to provide physical protection to the conductive polymer layer.

DETAILED DESCRIPTION

The present invention concerns a process of protecting a metal substrate from corrosion by application of a multilayer coating composition and the resultant coated articles.

The coated articles of the present invention include a metal substrate subject to corrosion. Such a metal substrate is generally composed of, e.g., alloy steel, stainless steel, iron, nickel, nickel-based alloys or aluminum. Such substrates are typically susceptible to corrosion under well known conditions of salt and moisture.

The conductive polymer layer preferably has a conductivity greater than about $10^{-5}$ siemens per centimeter (S/cm), more preferably a conductivity of at least $10^{-3}$ S/cm. Among the suitable conductive polymers are included polyaniline and substituted polyaniline wherein polyaniline is substituted with groups such as alkyl, aryl, hydroxy, alkoxy, chloro, bromo, or nitro. Other suitable conductive polymers having sufficient solubility for application as solutions include substituted polypyrrole, and polythiophenes such as polyalkylthiophenes, e.g., poly(3-hexylthiophene) and poly (3-octylthiophene). The conductive polymer, e.g., the polyaniline layer, can further be applied as a mixture or blend with another non-conductive polymer such as an epoxy, a polyurethane, an acrylic or a silicone. For example, the conductive polymer layer can be prepared by dispersing particles of a conductive polymer such as polyaniline into a film-forming polymer such as an epoxy, and then applying the film-forming polymer containing the dispersed conductive polymer particles to the metal substrate. In one embodiment, the conductive polymer should have a sufficient solubility in solvents such as N-methylpyrrolidone, nitromethane, tetrahydrofuran, dimethylsulfoxide, dimethylformamide, dimethylacetamide, or dichloromethane to allow for application of the conductive polymer onto the metal substrate as a solution. Generally, the conductive polymer layer will be from about 0.5 mils to about 5 mils in thickness.

The polyaniline can be prepared, e.g., by the method described by Cao et al. in Polymer, 30(12) 2305 (1989), such method hereby incorporated by reference. Generally, the polyaniline is prepared as an undoped, non-conductive material and conductivity is imparted to the polyaniline by subsequently doping with a suitable dopant. Optionally, the polyaniline may be directly prepared in the doped conductive state.

A suitable dopant for a polyaniline layer is any material capable of providing conductivity to the polyaniline layer and can be, e.g., boron trifluoride ($BF_3$), phosphorus pentachloride ($PCl_5$), aluminum trichloride ($AlCl_3$), tin tetrachloride ($SnCl_4$), zinc dinitrate ($Zn(NO_3)_2$), tetracyanoethylene (TCNE), para-toluenesulfonic acid, tungsten hexachloride ($WCl_6$), and hydrochloric acid. In one method of doping polyaniline to provide conductivity, a undoped, non-conductive polyaniline film or layer can be contacted with a solution of a dopant material for sufficient time to impart doping to the polyaniline film or layer. Suitable solvents for the dopants can include, e.g., N-methylpyrrolidone, tetrahydrofuran, methanol, acetonitrile, or water depending upon the particular dopant selected. Generally, such solutions of dopants will be from about 0.1 Molar to about 1.0 Molar. Optionally, the undoped polyaniline can be directly contacted with a gaseous dopant such as boron trifluoride.

After applying the conductive polymer layer to the metal substrate, a topcoat layer is then added to provide a physical barrier, sometimes a decorative layer, over the conductive layer. Generally, the topcoat layer will be from about 1 mil to about 125 mils in thickness although thicker layers may be also used. Thus, the resultant coated article includes a topcoat layer upon the conductive polymer layer upon the metal substrate. Among suitable topcoats can be included an epoxy layer, a polyurethane layer, an acrylic layer, or a silicone layer.

The term "epoxy" is generally meant to refer to polyepoxides although blends of monoepoxides and polyepoxides may be used. A wide variety of polyepoxides may be used and may be saturated or unsaturated, aliphatic, cycloaliphatic, aromatic, or heterocyclic and may be substituted, if desired with noninterfering substituents such as hydroxyl groups or the like. Examples of useful polyepoxides include polyglycidyl ethers of aromatic polyols, e.g., polyphenols. Such polyepoxides can be produced, e.g., by etherification of an aromatic polyol with epichlorohydrin or dichlorohydrin in the presence of an alkali. The aromatic polyol may be, e.g., bis(4-hydroxyphenyl)-2,2-propane (generally known as bisphenol A), his (4-hydroxyphenyl) -1,1-ethane, his ( 4-hydroxyphenyl ) -1,1-isobutane, bis( 4-hydroxytertiarybutylphenyl ) -2,2-propane, bis(2-hydroxynaphthyl)methane, 4,4'-dihydroxybenzophenone, 1,5-dihydroxynaphthalene and the like. Many additional examples of epoxy compounds are described in the Handbook of Epoxy Resins, Henry Lee and Kris Neville, 1967, McGraw Hill Book Co. Bisphenol A is generally the preferred aromatic polyol in the preparation of the polyepoxide.

The term "polyurethane" is generally meant to include the reaction products of polyisocyanates or polyisothiocyanates with polyols, and is also meant to include poly(urethane-ureas) and polyureas. The term "acrylic" is generally meant to refer to polymers or copolymers of an ethylenically unsaturated carboxylic acid such as acrylic acid or methacrylic acid, esters of such carboxylic acids or acrylonitrile. The term "silicone" is generally meant to include organosiloxane polymers including, e.g., dimethyl or methylphenyl silicone coatings such as Dow-Corning Corp. Product No. Q3-6077.

In the present process of coating a substrate, a conductive polymer layer, e.g., an undoped polyaniline layer, can be coated onto the substrate by, e.g., dipping the substrate into a solution of the polyaniline, spraying a solution of the polyaniline onto the substrate, or rolling a coating of the polyaniline onto the substrate, and then evaporating the solvent. The polyaniline coating layer can then be doped by contacting the coated substrate with a solution of the dopant or contacting the polyaniline layer with, e.g., gaseous boron trifluoride. Optionally, the polyaniline and dopant can be applied to the substrate in a single step, although in such instances the dopant should generally be an electron acceptor such as tetracyanoethylene. Following the application of the conductive layer, the topcoat can be applied by appropriate means such as dipping, rolling or spraying.

The present invention is more particularly described in the following examples which are intended as illustrative only, since numerous modifications and variations will be apparent to those skilled in the art.

Testing procedures for measuring the effects of corrosion in the following examples include: (1) 0.1 Molar HCl; and, (2) 3.5 percent by weight sodium chloride solution. The samples were immersed in the respective solution and leaned against a plastic tube whereby essentially all surfaces were exposed to the solution and air was continually bubbled through the solution.

EXAMPLE A

To a stirred solution of 40 grams (g) of freshly distilled aniline in 450 milliliters (ml) of 1.5 Molar (M) hydrochloric acid cooled at 0° C. was added dropwise a solution of 46 g ammonium persulfate in 80 ml of water. The temperature of the solution was allowed to rise to about 20° C., followed by again cooling to 0° C. and stirring for a total of about two hours. The resultant HCl-doped polyaniline was washed with 2.5 liters (l) of water, 500 ml of methanol and 100 ml of diethylether and allowed to air dry overnight. The resultant solid was crushed in a mortar and pestle and stirred in 3 percent by weight ammonium hydroxide for about two hours to form the undoped emeraldine base of the polyaniline. The solid was washed with 1.5 l of water, 500 ml of methanol and 200 ml of diethylether, air dried for several hours and dried under vacuum overnight. The inherent viscosity of the resultant material in concentrated sulfuric acid was measured as 0.70 deciliters per gram (dl/g). Solutions of from about 5 percent by weight to about 10 percent by weight of the polyaniline in N-methylpyrrolidone were prepared for the casting of films and applications of films by dipping or spraying.

A TCNE-doped polyaniline sample was prepared by drying a HCl-doped polyaniline solid, prepared as described above, the drying at 60° C. under vacuum for about 15 hours. The dried powder, having a conductivity of 0.016 S/cm was stirred in an acetonitrile solution of TCNE and sonicated for several hours. The solvent was removed and the sample was dried under vacuum at 60° C. The resultant TCNE-doped polyaniline had a conductivity of 0.090 S/cm.

EXAMPLE 1

A mixture of an epoxy resin, Bisphenol A GY 2600 resin available from Ciba-Geigy Corp. and a cycloaliphatic/aliphatic amine hardener, XU265 available from Ciba-Geigy Corp (at a weight ratio of epoxy:hardener of 2:1) was mixed with crushed HCl-doped polyaniline from Example A in a weight ratio of epoxy blend:doped polyaniline of 50:50 and coated onto one side of a pair of mild steel coupons. The mixture was cured overnight at about 60° C. The resultant coated coupons had a conductivity of about $1.3\times10^{-3}$ S/cm as measured upon the substrate and of about $1\times10^{-5}$ S/cm as measured in a piece of the coating off of the substrate. The entire coupon was then coated by dipping with a layer of the epoxy/hardener blend and cured for about 4 hours at 60° C. as before. Other mild steel coupons were coated with only the epoxy coating for comparison with the composite coating.

One composite coated coupon and two epoxy coated coupons were immersed in the hydrochloric acid solution for testing. After 48 hours the samples were examined for corrosion. Very little deterioration was seen for the composite coatings. The samples were returned to the HCl solution and reexamined periodically, after 1 week, 2 weeks, about 3 weeks, about 5 weeks, 8 weeks and 12 weeks. After 12 weeks the coupons coated with epoxy alone were crumbling on the edges with substantial mass loss and the samples appeared rust colored. The composite coated coupon including the polyaniline showed a minor amount of rust around the edges of the coupon, but showed no signs of corrosion upon the side of the coupon directly coated with the polyaniline blend. The opposite side of the coupon without the conductive polymer layer, i.e., coated only with the epoxy topcoat, showed corrosion.

The second composite coated coupon and two additional epoxy coated coupons were immersed in the saline solution for testing. After 48 hours the samples were examined for corrosion. Very little deterioration was seen for the composite coatings, while some pitting was seen in the epoxy coated coupons. The samples were returned to the saline solution and reexamined periodically, after 1 week, 2 weeks, about 3 weeks, about 5 weeks, 8 weeks and 12 weeks. After 12 weeks the coupons coated with epoxy alone were crumbling on the edges with substantial mass loss and the samples appeared rust colored. The composite coated coupon including the polyaniline showed a minor amount of rust around the edges of the coupon, but showed no signs of corrosion upon the side of the coupon directly coated with the polyaniline blend. The opposite side of the coupon without the conductive polymer layer, i.e., coated only with the epoxy topcoat, showed corrosion.

EXAMPLE 2

Mild steel coupons previously dip-coated with a solution of undoped polyaniline were doped with tetracyanoethylene (TCNE) by placing the coupons into a 0.5 Molar solution of TCNE in tetrahydrofuran and chilling in a refrigerator at about 10° C. for about twentyfour hours. The coupons were removed from solution, rinsed with tetrahydrofuran and air-dried. The coated/doped coupons were then tested for corrosion by placing two coupons in a 0.1 Molar HCl solution and two coupons in a 3.5 percent by weight sodium chloride solution and testing as before. Corrosion testing was carried out for seven days after which the coupons were removed and examined. All of the samples showed signs of cracking in the polyaniline coating after 24 hours and large amounts of rusting and coating loss were observed.

The results of Examples 1 and 2 indicate that the composite coating, including a layer containing conductive polyaniline and a topcoat of epoxy, has superior corrosion resistance in comparison to a coating of either polyaniline or epoxy alone.

EXAMPLE 3

Steel coupons were coated with undoped polyaniline as in Example 2. Sets of the coupons, each with a layer of the undoped polyaniline, were placed into either a 0.505M solution of zinc nitrate in tetrahydrofuran (THF) for a period of one hour or a 0.5M solution of para-toluenesulfonic acid in THF. The coupons were removed and rinsed with THF and air-dried. The coupons were then coated with a layer of epoxy as in Example 1 and cured at 60° C. for 12 hours. Two of the resultant coupons were tested in the HCl solution, while the other two coupons were tested in the saline solution. After about 5 weeks, none of the coupons exhibited signs of corrosion.

EXAMPLE 4

Four steel coupons were coated with undoped polyaniline and doped with TCNE as in Example 2 and topcoated with epoxy and cured as in Example 3. Each of the bilayer coated samples was scratched by a scribe through the coating to expose the metal. Two samples were then tested in the HCl solution, while the other two were tested in the saline solution. After about 8 weeks of exposure, none of the coupons exhibited signs of corrosion, while similarly scribed coupons coated only with the epoxy layer showed pitting and corrosion in the scratched area.

Although the present invention has been described with reference to specific details, it is not intended that such details should be regarded as limitations upon the scope of the invention, except as and to the extent that they are included in the accompanying claims.

What is claimed is:

1. A coated article having improved corrosion resistance when scratched through the coating to the substrate and subjected to exposure to an aerated 0.1 Molar hydrochloric acid solution for eight weeks comprising:

a metal substrate subject to corrosion selected from the group consisting of stainless steel, iron, nickel, nickel-based alloys and aluminum;

a layer of a conductive polymer coating of from about 0.5 to 5 mils in thickness upon said metal substrate, said conductive polymer coating layer having a first side directly adhered to the metal surface and a second side opposite the first side; and, a topcoat layer adhered upon the second side of the conductive polymer coating layer, said topcoat layer adapted to provide physical protection to the conductive polymer layer.

2. The coated article of claim 1 wherein the conductive polymer coating is selected from the group consisting of polyaniline, polyaniline substituted with alkyl, aryl, hydroxy, alkoxy, chloro, bromo, or nitro groups, polypyrrole, and polythiophene.

3. The coated article of claim 1 wherein the conductive polymer coating is polyaniline.

4. The coated article of claim 1 wherein the topcoat layer is comprised of a material selected from the group consisting of polyepoxides, polyurethane, acrylic polymers and organosiloxane polymers.

5. The coated article of claim 1 wherein the topcoat layer is comprised of polyepoxides.

6. The coated article of claim 1 wherein the topcoat layer is comprised of polyurethane.

7. The coated article of claim 1 wherein the topcoat layer is comprised of acrylic polymer.

8. The coated article of claim 1 wherein the topcoat layer is comprised of organosiloxane polymers.

9. The coated article of claim 1 wherein the topcoat layer is from about 1 to 125 mils in thickness.

* * * * *